United States Patent [19]

Endres et al.

[11] Patent Number: 5,416,135
[45] Date of Patent: May 16, 1995

[54] CATIONIC LAYER COMPOUNDS MODIFIED WITH POLYMERS

[75] Inventors: Helmut Endres, Langenfeld; Herbert Fischer, Duesseldorf; Frido Loeffelholz; Peter Wedl, both of Bremerhaven; Kurt Worschech, Lostedt; Angela Hansen, Duesseldorf; Guenther Geismar, Krefeld, all of Germany

[73] Assignee: Henkel Kommanditgesellschaft auf Aktien, Duesseldorf, Germany

[21] Appl. No.: 142,404

[22] PCT Filed: May 15, 1992

[86] PCT No.: PCT/EP92/01078

§ 371 Date: Jan. 24, 1994

§ 102(e) Date: Jan. 24, 1994

[87] PCT Pub. No.: WO92/20619

PCT Pub. Date: Nov. 26, 1992

[30] Foreign Application Priority Data

May 24, 1991 [DE] Germany ............... 41 17 034.2

[51] Int. Cl.⁶ .................................. C08K 9/04
[52] U.S. Cl. ........................... 523/205; 523/210; 524/178; 524/436; 524/450; 524/556; 524/562; 524/567; 524/386
[58] Field of Search .............. 523/205, 210; 524/450, 524/178, 436, 567, 562, 556, 386

[56] References Cited

U.S. PATENT DOCUMENTS

| | | | |
|---|---|---|---|
| 3,826,066 | 1/1975 | Reiter et al. | 524/178 |
| 3,898,189 | 8/1975 | Bonnaud et al. | 524/567 |
| 4,119,601 | 10/1978 | Bonnaud et al. | 524/567 |
| 4,208,317 | 6/1980 | Cerny et al. | 260/38 |
| 4,675,356 | 6/1987 | Miyata | 524/436 |
| 4,713,411 | 12/1987 | Kanou et al. | 524/562 |
| 5,028,482 | 7/1991 | Jeffs | 523/205 |
| 5,049,592 | 9/1991 | Kronstein | 523/210 |
| 5,049,594 | 9/1991 | Jeffs | 523/205 |
| 5,106,898 | 4/1992 | Nosu et al. | 524/436 |
| 5,143,965 | 9/1992 | Mertz | 524/436 |

FOREIGN PATENT DOCUMENTS

| | | |
|---|---|---|
| 0189899 | 8/1986 | European Pat. Off. . |
| 0335544 | 10/1989 | European Pat. Off. . |
| 0407139 | 1/1991 | European Pat. Off. . |
| 1939544 | 3/1971 | Germany . |
| 2905256 | 8/1979 | Germany . |
| 2061144 | 12/1979 | Germany . |
| 1592126 | 11/1981 | Germany . |
| 3019632 | 8/1984 | Germany . |
| 3306822 | 8/1984 | Germany . |

OTHER PUBLICATIONS

Kirk–Othmer Encyclopedia of Chemical Technology; 3rd Ed., 1979, vol. 7, pp. 833–848; Wiley, New York (US).
W. T. Reichle in Chemtec, Jan. 1986, pp. 58–63.
V. R. Allmann in Chimia 24, pp. 99–108, 1970.
Roempp's Cheic Lexikon, Band 1, 8, Auflage, 1979, p. 423.
Kirk–Othmer Encyclopedia of Chemical Technology, vol. A8, 5th Edition, 1987, pp. 586–601.
Ulmann's Encyclopedia der technischen Chemie, Band 19, 4, Auflage, pp. 2–11, 1980.
Ulman's Encyclopedia der technischen Chemie, Band 16, Auflage, pp. 254–257, 1978.

*Primary Examiner*—Veronica P. Hoke
*Attorney, Agent, or Firm*—Ernest G. Szoke; Wayne C. Jaeschke; John Daniel Wood

[57] ABSTRACT

Halogen-containing synthetic resins can be stabilized with calcium and zinc soaps of which the effectiveness is enhanced by co-stabilizers.

The invention relates to special cationic layered hydrotalcite compounds having a specific BET surface of at least 50 m²/g which are modified with at least one polymeric additive, to processes for the production of these cationic layer compounds and to their use as co-stabilizers for halogen-containing synthetic resins stabilized with calcium and/or zinc salts.

52 Claims, No Drawings

CATIONIC LAYER COMPOUNDS MODIFIED WITH POLYMERS

BACKGROUND OF THE INVENTION

1. Field of the Invention

This invention relates to special cationic layer compounds having a specific BET surface of at least 50 m²/g which are modified with at least one polymeric additive, to processes for the production of these cationic layer compounds and to their use as co-stabilizers for halogen-containing synthetic resins stabilized with calcium and/or zinc salts.

2. Discussion of Related Art

It is known that halogen-containing synthetic resins or molding compounds produced from them tend to degrade or decompose on exposure to heat or ultraviolet light. To counteract this, heavy metal compounds based on lead, tin, barium and/or cadmium are normally used. For reasons of factory hygiene, however, there is a need to replace these thoroughly effective stabilizers by less health-damaging materials. Possible alternative stabilizers to the heavy metal compounds are, for example, calcium and zinc soaps, but unfortunately they do not perform as well as the heavy metal compounds so that co-stabilizers have to be used in order to enhance their stabilizing effect.

German patent DE-C-30 19 632 describes the use of hydrotalcites for inhibiting the thermal or ultraviolet degradation of halogen-containing thermoplastic resins. This patent specification discloses test results which show that, when readily commercially available hydrotalcites are incorporated, for example, in vinyl chloride resins, they accelerate the dechlorination of the resins on heating or even cause decomposition, blackening or foaming of the resins. In addition, it was found that these hydrotalcites show poor dispersibility in the resins and adversely affect the rheological properties of the resins during molding and also the appearance of the molded products obtained. These test results are attributed to the small crystal size of the usual hydrotalcites and to the large specific BET surface of at least about 50 m²/g and the coverage of the hydrotalcite particles with water. Accordingly, it is proposed in German patent DE-C-30 19 632 to use hydrotalcites which have a large crystal size and a specific BET surface of no larger than 30 m²/g and which may optionally be coated with an anionic surfactant, such as sodium stearate. European patent application EP-A-189 899 also describes resin compositions containing hydrotalcites having specific BET surfaces below 30 m²/g. It is known from this European patent application that the hydrotalcites can be modified with higher fatty acid esters, anionic surfactants and coupling agents of the silane or titanium type in order to improve the compatibility of the hydrotalcite with the resins.

However, cationic layer compounds having such small specific surfaces can only be obtained at considerable expense because the crystallization of the solid from the aqueous phase has to take place in a pressure reactor at temperatures well above the normal boiling point of water. This involves considerable outlay on equipment and leads to an unsatisfactory volume/time yield on account of the long crystallization times. In addition, the use of hydrotalcites having small specific surfaces is attended by the disadvantage that hydrogen chloride given off during the thermal decomposition of vinyl chloride resins can only be trapped over a very small surface.

DESCRIPTION OF THE INVENTION

The problem addressed by the present invention was to provide co-stabilizers for halogen-containing synthetic resins which would be compatible with calcium and zinc compounds, which would be dispersible in the halogen-containing resins without adversely affecting their rheological behavior and which would be safe from the point of view of factory hygiene. In addition, the co-stabilizers would be capable of trapping the products given off during the decomposition of halogen-containing synthetic resins, such as hydrogen chloride.

The present invention relates to cationic layer compounds corresponding to general formula I

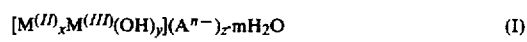

$$[M^{(II)}_x M^{(III)}(OH)_y](A^{n-})_z \cdot mH_2O \qquad (I)$$

in which $M^{(II)}$ represents at least one divalent metal ion, $M^{(III)}$ represents at least one trivalent metal ion, $A^{n-}$ represents an acid anion having a charge n (n=1, 2 or 3), with the proviso that $1<x<5$, $0\leq z<y$, $(y+nz)=2x+3$ and $0<m<10$, which have a specific BET surface of at least 50 m²/g and which are modified with additives, characterized in that they are modified A) with one or more polymeric additives which are soluble in polar organic solvents and/or in water having pH values above 8 and which have a molecular weight of 500 to 50,000, on their own or in combination with one or more additives selected from the following groups:

B) polyols containing 3 to 30 carbon atoms and at least two hydroxyl groups,

C) esters of partly and completely epoxidized unsaturated carboxylic acids containing 6 to 22 carbon atoms, D) full and partial esters of polyols containing 3 to 30 carbon atoms and 2 to 12 hydroxyl groups with carboxylic acids containing 6 to 22 carbon atoms and E) alkyl and aryl phosphites.

The cationic layer compounds corresponding to general formula I are compounds known per se of which the structure and preparation are described, for example, by W.T. Reichle in Chemtec (January 1986), pages 58 to 63. Cationic layer compounds corresponding to general formula I in which $M^{(II)}$ represents at least one divalent metal ion selected from the group consisting of magnesium, calcium, zinc, barium and strontium, are preferred for the purposes of the invention. In a preferred embodiment, $M^{(II)}$ represents only one divalent metal ion from the group mentioned, more particularly magnesium. In general formula I, $M^{(III)}$ best represents at least one trivalent metal ion selected from the group consisting of aluminium, bismuth, antimony, boron, gallium and indium and, preferably, only one trivalent metal ion from this group, more preferably aluminium. Cationic layer compounds corresponding to general formula I, in which $A^{n-}$ represents an acid anion having a charge of n selected from the group of anions consisting of carbonate, hydrogen carbonate, perchlorate, acetate, nitrate, tartrate, oxalate, hydroxide and iodide, preferably carbonate, are most particularly preferred. Where reference is made to at least one divalent or at least one trivalent metal ion in the explanation of formula I above, it means that different divalent or trivalent metal ions may also be present alongside one another in the cationic layer compound. The indices x, y and z and m may represent whole or broken numbers within the limits mentioned above; z may also be zero. Cationic layer compounds corresponding to general formula I, in which $M^{(II)}$ represents magnesium, $M^{(III)}$ represents aluminium and $A^{n-}$ represents carbonate, are particularly advantageous. One example of this preferred group is hydrotalcite which occurs naturally as a mineral and to which the composition $$[Mg_6 \: Al_2 \: (OH)_{16}]CO_3 \cdot 4 \: H_2O$$

is normally assigned (cf. Chimia 24, pages 99–108;1970); this formula can be converted to general formula I by division by a factor of 2. Particularly suitable are synthetic hydrotalcites which may also be called basic aluminium/magnesium carbonates and which may be obtained by the processes described in DE-B-15 92 126 and in DE-A-20 61 114 or DE-A 29 05 256. Hydrotalcites corresponding to the formula $$[Mg_4Al_2(OH)_{12}](CO_3) \cdot mH_2O$$

where m is as already defined, which may be produced in accordance with DE-C-33 06 822 are most particularly preferred. According to DE-C-33 06 822, hydrotalcites corresponding to the formula $[Mg_6Al_2(OH)_{12}](CO_3)_3 \cdot 4H_2O$ are obtained by reaction of aluminium hydroxide with magnesium hydroxide or magnesium oxide in the presence of basic magnesium carbonate as carbonate ion donor at a temperature of 50° C. to 100° C. and subsequent spray drying of the suspension. According to the invention, however, the production of the particularly preferred hydrotalcites is not confined to this particular process. Thus, the reaction may also take place in the presence of other carbonate salts, although this is less preferred because of the introduction of foreign ions. In addition, the hydrotalcites may also be recovered from the suspension by other standard separation and drying processes, although spray drying is preferred. The ratios in which magnesium, aluminium and/or carbonate ions are used can also be varied.

Cationic layer compounds produced by any of these processes have a specific BET surface of at least 50 $m^2/g$ and preferably in the range from 70 to 180 $m^2/g$. According to the invention, the expression "specific BET surface" corresponds to the definition given in Römpp's Chemie Lexikon, Vol. 1, 8th Edition, 1979, page 423.

According to the invention, the cationic layer compounds are to be modified with one or more polymeric additives A) which are soluble in polar organic solvents and/or water having pH values above 8 and preferably in the range from 9 to 12 and which have an average (number average) molecular weight of 500 to 50,000. "Soluble" in the context of the invention means that more than 0.01% by weight of the polymeric additives are soluble in the solvents and preferably at least 0.1% by weight thereof are soluble in an aqueous solution having a pH value of 10 adjusted with alkali metal hydroxides at 20° C.; more particularly, they form completely clear solutions under the described conditions. In the context of the invention, polar organic solvents are understood to be hydrocarbon compounds which are liquid at room temperature (15° to 25° C.) and which bear at least one substituent which is more electronegative than carbon, including chlorinated hydrocarbons, alcohols, ketones, esters, ethers and/or glycol ethers. Suitable polar organic solvents are methanol, ethanol, n-butanol, acetone, methyl ethyl ketone, methyl isobutyl ketone, cyclohexanol, isophorone, ethyl acetate, lactic acid ethyl ester, 2-methoxyethyl acetate, tetrahydrofuran, ethylene glycol monomethyl ether, diethylene glycol monoethyl ether. The solubility of the polymeric additives ensures that the surface of the cationic layer compounds can be uniformly modified by one of the processes according to the invention to be described in the following. In principle, any of the polymers known to the expert as pigment dispersants (cf. Kirk-Othmer, "Encyclopedia of Chemical Technology", Vol. 7, 3rd Edition, 1979, pages 840–841 or Ullmann's "Encyclopedia of Industrial Chemistry", Vol. A8, 5th Edition, 1987, pages 586–601) may be used as the polymeric additives providing they satisfy the solubility molecular and weight requirements. Acrylic acid and methacrylic acid homo- and copolymers, lignin sulfonates and trimer fatty acids are preferred polymeric additives. Particularly suitable polymeric additives are those selected from the group consisting of polymers of acrylic and methacrylic acid and copolymers thereof with unsaturated monomers containing sulfonic acid groups, unsaturated monomers containing phosphonic acid groups, unsaturated aliphatic $C_{3-5}$ carboxylic acids, amides of unsaturated aliphatic $C_{3-5}$ carboxylic acids, aminofunctional unsaturated monomers and/or salts thereof, vinyl acetate, vinyl chloride, acrylonitrile, vinylidene chloride, 1,3-butadiene, styrene, alkyl styrenes containing 1 to 4 C atoms in the alkyl group. Examples include polyacrylic acid, polymethacrylic acid (acrylic acid and methacrylic acid and derivatives thereof are referred to more simply hereinafter as (meth)acrylic acid or derivatives) and/or salts thereof, such as polysodium (meth)acrylate, copolymers of (meth)acrylic acid with maleic acid, maleic anhydride, styrene sulfonic acid, o-methyl styrene, 2-vinyl pyridine, 1-vinyl imidazole, dimethylaminopropyl (meth)acrylamide, 2-(meth)acrylamido-2-methylpropane sulfonic acid, (meth)acrylamide, N-hydroxydimethyl (meth)acrylamide and/or salts thereof. Among the polymeric additives, those which are predominantly anionic in character, i.e. which contain a majority of acid groups in free form or in the form of their salts, are most particularly preferred. Polymers of (meth)acrylic acid and copolymers thereof with styrene, alkyl styrenes containing 1 to 4 C atoms in the alkyl group, styrene sulfonic acid, maleic acid and/or salts thereof, particularly sodium salts and maleic anhydride, are especially preferred. The polymeric additives best have a molecular weight of 1,000 to 10,000. The polymeric additives may be produced by known methods, such as bulk or solution polymerization (cf. Ullmann's Encyclopädie der technischen Chemie, Vol. 19, 4th Edition, pages 2–11, 1980). Processes for the preparation of lignin sulfonic acid and salts thereof are also described in Ullmann's Encyclopädie der technischen Chemie, Vol. 16, 4th Edition, pages 254–257, 1978. Trimer fatty acids are commercial products which are obtained as residue in the distillation of dimer fatty acid, such as Pripol ®1040 (Unichema) or Emery ®1000 (Emery).

According to the invention, the cationic layer compounds may be modified with one or more polymeric additives on their own or in combination with other additives. Polyols containing at least two hydroxyl groups and a total of 3 to 30 carbon atoms are suitable other additives in group B). Examples of such polyols are diols containing 3 to 30 carbon atoms, such as butanediols, hexanediols, dodecanediols, and trimethylol propane, pentaerythritol, glycerol and technical oligomer mixtures thereof having average degrees of condensation of 2 to 10. Polyols containing 3 to 30 carbon atoms which bear at least one hydroxyl group or an ether oxygen every three carbon atoms, such as glycerol and/or technical oligoglycerol mixtures having average degrees of condensation of 2 to 10, are most particularly preferred.

The additives of group C) are esters of partly or completely epoxidized unsaturated carboxylic acids containing 6 to 22 carbon atoms. Suitable esters are esters of monohydric, dihydric and/or trihydric alcohols which are completely esterified with epoxidized unsaturated carboxylic acids containing 6 to 22 carbon atoms, such as methyl, 2-ethylhexyl, ethylene glycol, butanediol, neopentyl glycol, glycerol and/or trimethylol propane esters of epoxidized lauroleic acid, palmitoleic acid, oleic acid, ricinoleic acid, linoleic acid and/or linolenic acid. Esters of trihydric alcohols and substantially completely epoxidized unsaturated carboxylic acids containing 12 to 22 carbon atoms are preferred, esters of glycerol with substantially completely epoxidized unsaturated carboxylic acids containing 12 to 22 carbon atoms being particularly preferred. The carboxylic acid component may be derived, for example, from unsaturated palmitoleic acid, oleic acid, elaidic acid, petroselic acid, ricinoleic acid, linolenic acid, gadoleic acid or erucic acid which are epoxidized by known methods. As usual in oleochemistry, the epoxidized carboxylic acid glycerides may also be the technical mixtures obtained by epoxidation of natural unsaturated fats and unsaturated oils. Epoxidized rapeseed oil, epoxidized unsaturated soybean oil and/or epoxidized sunflower oil from new crops is/are preferably used.

The additives of group D) are full or partial esters obtained by the relevant methods of preparative organic chemistry, for example by acid-catalyzed reaction of polyols with carboxylic acids. Suitable polyol components are any of those already discussed in connection with group B). The acid component is preferably selected from aliphatic, saturated and/or unsaturated carboxylic acids containing 6 to 22 carbon atoms, such as caproic acid, caprylic acid, capric acid, lauric acid, myristic acid, palmitic acid, palmitoleic acid, stearic acid, oleic acid, ricinoleic acid, linoleic acid, linolenic acid, behenic acid or erucic acid. As usual in oleochemistry, the carboxylic acid component may also be a technical mixture of the type obtained in the pressure hydrogenation of natural fats and oils. Partial esters of glycerol and, in particular, technical oligoglycerol mixtures having average degrees of condensation of 2 to 10 and saturated and/or unsaturated aliphatic carboxylic acids containing 6 to 22 carbon atoms are preferred.

Finally, alkyl and aryl phosphites, preferably those corresponding to general formula II

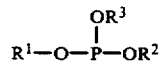

in which $R^1$, $R^2$ and $R^3$ independently of one another represent a $C_{1-18}$ alkyl radical or a phenyl radical, may be used as the additives of group E). Typical examples of group E) additives are tributyl phosphite, triphenyl phosphite, dimethylphenyl phosphite and/or dimethyl-stearyl phosphite. Diphenyldecyl phosphite is preferred.

According to the invention, the polymeric additives may be used with one or more additives from groups B) to E) to modify the cationic layer compounds, the total quantity of additive being in the range from 0.5 to 15% by weight, based on cationic layer compounds. Where the polymeric additives are used in combination with other additives, it is preferred to use the polymeric additives in quantities of 10 to 99% by weight and, more particularly, in quantities of 30 to 95% by weight, based on the total quantity of additives.

The present invention also relates to processes for the production of the cationic layer compounds according to the invention. The first (process 1.) is a process for the production of cationic layer compounds corresponding to general formula I

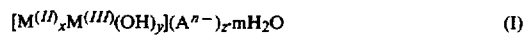

in which $M^{(II)}$ represents at least one divalent metal ion,
$M^{(III)}$ represents at least one trivalent metal ion,
$A^{n-}$ represents an acid anion having a charge n (n=1, 2 or 3),
with the proviso that $1<x<5$, $0 \leq z<y$, $(y+nz)=2x+3$ and $0<m<10$, which have a specific BET surface of at least 50 m²/g and which are modified with additives, characterized in that layer compounds corresponding to formula I are precipitated from aqueous solutions or suspensions containing the ions $M^{(II)}$, $M^{(III)}$ and $A^{n-}$ in the presence of A) one or more polymeric additives which are soluble in polar organic solvents and/or in water having pH values above 8 and which have a molecular weight of 500 to 50,000, on their own or in combination with one or more additives selected from the following groups:

B) polyols containing 3 to 30 carbon atoms and at least two hydroxyl groups,

C) esters of partly and completely epoxidized unsaturated carboxylic acids containing 6 to 22 carbon atoms, D) full and partial esters of polyols containing 3 to 30 carbon atoms and 2 to 12 hydroxyl groups with carboxylic acids containing 6 to 22 carbon atoms and E) alkyl and aryl phosphites, dried and optionally redried.

In the first process, the cationic layer compounds according to the invention are produced in situ. The cationic layer compounds must be formed with a specific BET surface of at least 50 m²/g. This can be achieved with the above-cited conventional processes according to DE-B-15 92 126 or DE-A-20 61 114 or DE-A-29 05 256. At all events, it is important to avoid reaction conditions in the production of cationic layer compounds which, as in European patent application EP-A-189 899, lead to products having specific surfaces of smaller than 30 m²/g. The process is described by way of example in the following with reference to the particularly preferred hydrotalcite which, according to the invention, is preferably produced as described in DE-C-33 06 822. According to this document, aluminium hydroxide is reacted with magnesium hydroxide and/or magnesium oxide in aqueous suspension in the presence of carbonate ions, with the proviso that the polymeric additives may optionally be present in combination with other additives from groups B) to E). The additives may be added either before or together with magnesium hydroxide and/or magnesium oxide to aluminium hydroxide or before or together with aluminium hydroxide to magnesium hydroxide and/or magnesium oxide. The additives are best added to aluminium hydroxide with stirring at room temperature (15° to 25° C.) before the reaction with magnesium hydroxide and/or magnesium oxide, preferably magnesium oxide only, takes place. Reaction temperatures of 50° to 100° C. are recommended in order to accelerate the subsequent reaction. The quantities of magnesium and aluminium in the form of their hydroxides or oxides and of carbonate are determined by the desired hydrotalcite and can be worked out from general formula I. The carbonate ions may be introduced in the form of their salts, preferably as magnesium hydroxide carbonate. The slurry formed during the reaction is then dried by any of the known methods, preferably by spray drying. Drying is best carried out at temperatures which exceed the boiling point of the additives by no more than 10° C. and, more particularly, not at all. In some cases, the additional removal of water by redrying, which is advantageously carried out at temperatures of 110° to 280° C., for example in a drying cabinet, leads to improved cationic layer compounds according to the invention. This first method gives cationic layer compounds which are modified very homogeneously with the additives already described.

The second process concerns the production of cationic layer compounds corresponding to general formula I having a specific BET surface of at least 50 m$^2$/g and modified with additives, characterized in that layer compounds corresponding to formula I are precipitated from aqueous solutions or suspensions containing the ions $M^{(II)}$, $M^{(III)}$ and $A^{n-}$ in the presence of A) one or more polymeric additives which are soluble in polar organic solvents and/or in water having pH values above 8 and which have a molecular weight of 500 to 50,000, dried and optionally redried and the product obtained is ground in the presence of polar organic solvents or water containing one or more additives selected from the following groups:

B) polyols containing 3 to 30 carbon atoms and at least two hydroxyl groups,

C) esters of partly and completely epoxidized unsaturated carboxylic acids containing 6 to 22 carbon atoms, D) full and partial esters of polyols containing 3 to 30 carbon atoms and 2 to 12 hydroxyl groups with carboxylic acids containing 6 to 22 carbon atoms and E) alkyl and aryl phosphites, dried and optionally redried.

In the second process (process 2.) for the production of the layer compounds according to the invention, the layer compounds of formula I are first prepared from aqueous solutions or suspensions only in the presence of the polymeric additives as in process 1., dried and optionally redried. Particulars of the production of the cationic layer compounds modified with polymeric additives can be found in the description of process 1. The product thus obtained is then thoroughly ground with one or more additives selected from groups B) to E) in the presence of the polar organic solvents already described or in the presence of water, preferably in grinding mills and more preferably in a ball mill. The ground product is then dried in the usual way, preferably at temperatures no more than 10° C. above the boiling points of the additives, and optionally redried as described for process 1.

The third process concerns the production of cationic layer compounds corresponding to general formula I having a specific BET surface of at least 50 m$^2$/g and modified with additives, characterized in that layer compounds corresponding to formula I are precipitated from aqueous solutions or suspensions containing the ions $M^{(II)}$, $M^{(III)}$ and $A^{n-}$ in the presence of B) polyols containing 3 to 30 carbon atoms and at least two hydroxyl groups, C) esters of partly and completely epoxidized unsaturated carboxylic acids containing 6 to 22 carbon atoms, D) full and partial esters of polyols containing 3 to 30 carbon atoms and 2 to 12 hydroxyl groups with carboxylic acids containing 6 to 22 carbon atoms and E) alkyl and aryl phosphites, dried and optionally redried and the product obtained is ground in the presence of polar organic solvents or water with one or more polymeric additives which are soluble in polar organic solvents and/or in water having pH values above 8 and which have a molecular weight of 500 to 50,000, dried and optionally redried.

In the third process (process 3.), layer compounds of formula I are first prepared from aqueous solutions or suspensions solely in the presence of additives from groups B) to E) as in process 1. The product thus obtained is then ground with one or more of the described polymeric additives in the presence of the polar organic solvents already described or in the presence of water, dried and optionally redried. Grinding is carried out as in process 2. Drying and redrying have also been described.

The fourth process concerns the production of cationic layer compounds corresponding to general formula I having a specific BET surface of at least 50 m$^2$/g and modified with additives, characterized in that layer compounds corresponding to formula I are ground in the presence of polar organic solvents or water with A) one or more polymeric additives which are soluble in polar organic solvents and/or in water having pH values above 8 and which have a molecular weight of 500 to 50,000, on their own or in combination with one or more additives selected from the following groups:

B) polyols containing 3 to 30 carbon atoms and at least two hydroxyl groups,

C) esters of partly and completely epoxidized unsaturated carboxylic acids containing 6 to 22 carbon atoms, D) full and partial esters of polyols containing 3 to 30 carbon atoms and 2 to 12 hydroxyl groups with carboxylic acids containing 6 to 22 carbon atoms and E) alkyl and aryl phosphites, dried and optionally redried.

In the fourth process (process 4.), cationic layer compounds having a specific surface of larger than 50 m$^2$/g are thoroughly ground with the polymeric additives A) on their own or in combination with additives from groups B) to E) in the presence of the polar organic solvents already described or in the presence of water, preferably in grinding mills and more preferably in a ball mill, subsequently dried in the usual way, preferably in a vacuum drying cabinet and optionally redried as described. The cationic layer compounds which may be used for process 4. are either conventional, already described unmodified cationic layer compounds and/or cationic layer compounds which were modified with additives from groups B) to E) during the precipitation of the cationic layer compounds from aqueous solution or suspension in the first step of process 1.

In processes 1. to 4., the polymeric additives A) are added on their own or in combination with one or more additives from groups B) to E) in quantities of 0.5 to 15% by weight, based on cationic layer compounds. If the polymeric additives are used in combination with other additives from group B), the quantity of polymeric additives A) is preferably 10% by weight to 99% by weight and more preferably 30 to 95% by weight, based on the total quantity of additives. If desired, the cationic layer compounds obtained by process 1. may then be modified with at least one liquid or low-melting, dispersing additive selected from groups B) to C) by intensive mixing at room temperature (15° to 25° C.) or at a temperature below the decomposition temperatures of the cationic layer compounds and/or the additives, preferably below 300° C. Low-melting additives are understood to be additives which can be converted into the liquid state at temperatures below the above-mentioned decomposition temperatures under normal pressure. If the cationic layer compounds produced by process 1. are to be modified in this way, a total of 3 to 100% by weight, based on cationic layer compounds, of the additives B) to E) may be present in addition to the quantities mentioned above.

The present invention also relates to the use of cationic layer compounds of the described type as co-stabilizers for halogen-containing synthetic resins stabilized with calcium and/or zinc salts of carboxylic acids containing 6 to 22 carbon atoms. The cationic layer compounds according to the invention are preferably used as co-stabilizers in halogen-containing synthetic resins, more particularly in PVC. To this end, the surface-modified cationic layer compounds are added in quantities of 0.01 to 5 parts by weight and preferably in quantities of 0.1 to 3 parts by weight, based on 100 parts by weight resin. In general, they are mechanically mixed with the resins present in granular form before being subjected to processing, for example by calendering or extrusion. Commercially available zinc and/or calcium salts of carboxylic acids containing 6 to 22 carbon atoms are incorporated as conventional stabilizers, generally at the same time as the surface-modified cationic layer compounds. Other conventional additives, such as the heat stabilizers described in EP-A-189 899, may of course also be used. The quantities in which the stabilizers and co-stabilizers (modified cationic layer compound) are used may be varied as required, with the proviso that the total addition of stabilizer makes up from 0.5 to 5 parts by weight per 100 parts by weight resin. Accordingly, the minimum quantity of modified cationic layer compounds is at least 0.01% by weight.

The effect of zinc and/or calcium soaps as stabilizers for halogen-containing synthetic resins is enhanced by the use of the cationic layer compounds according to the invention. In addition, the modified cationic layer compounds as co-stabilizers may readily be incorporated in the halogen-containing synthetic resins without adversely affecting their rheological properties.

EXAMPLES

A) Preparation of the modified cationic layer compounds

Example 1

Addition of additive during formation of the cationic layer compound 300 g of an aluminium hydroxide gel having an aluminium content of 0.56 mol were stirred with 800 g fully deionized water (FD water) at room temperature. The additives or additive mixtures shown in Table 1 were then added in the quantities indicated and the mixture was heated to 80° C. 61.6 g magnesium hydroxide carbonate, corresponding to 0.64 mol magnesium, and 17.6 g magnesium oxide, corresponding to 0.44 mol magnesium, in powder form were added at the temperature of 80° C. The mixture was then stirred under reflux for 2 hours and, after cooling, was directly spray-dried using a Büchi laboratory spray dryer (air entry temperature 130° to 160° C., exit temperature 100° to 105° C.). In some cases, the powder-form spray-dried product was redried for 2 hours in a laboratory drying cabinet.

The additives or additive mixtures are listed in Table 1. The quantities indicated for the additives represent % by weight, based on the theoretical yield of cationic layer compound corresponding to the formula $[Mg_4 Al_2 (OH)_{12}] (CO_3) \cdot 4H_2O$. The temperature indicated is the redrying temperature in °C.

A copolymer of 46% by weight styrene, 23% by weight α-methyl styrene and 31% by weight acrylic acid having a molecular weight (weight average) of 6,000 (copolymer 1) was used as the polymeric additive.

TABLE 1

| | Cationic layer compound modified with | | |
|---|---|---|---|
| Ex. | Additive | Quantity | Redrying in °C. |
| 1a | Copolymer 1 | 2.2 | — |
| 1b | Copolymer 1 | 2.2 | 200 |
| 1c | Copolymer 1 and | 2.2 | 200 |
| | epoxidized soybean oil (saponification value SV 125, epoxide oxygen content 5.8% by weight) | 2.2 | |
| 1d | Copolymer 1 and | 2.2 | 200 |
| | glycerol | 2.2 | |
| 1e | Copolymer 1 and | 2.2 | 200 |
| | epoxidized soybean oil (SV 125; EO 5.8) and | 2.2 | |
| | glycerol | 2.2 | |

Example 2

Grinding of the cationic layer compounds with additives

Hydrotalcite of the C 300 type (Giulini Chemie GmbH), specific surface 115 m²/g, was used as the cationic layer compound. 19.4 g of the hydrotalcite were ground for 1 hour in a glass ball mill 2a) with copolymer 1 of Example 1 and 80 g fully deionized water, 2b) with copolymer 1 of Example 1 and 80.6 g epoxidized soybean oil (SV 125; EO 5.8) and 80 g fully deionized water, 2c) with 1 g of a 60% by weight solution of a copolymer of 95% by weight methyl acrylate and 5% by weight dimethylaminopropyl methacrylamide (MW 5,000) in xylene and 60 g ethyl methyl ketone.

The glass balls were then removed by sieving and the solid was filtered off. The modified hydrotalcite was then dried at 75° C. in a vacuum drying cabinet, powdered and redried for 2 hours at 200° C. in a drying cabinet.

Example 3

Grinding of premodified cationic layer compounds with additives 800 g fully deionized water were added at room temperature to 300 g of the aluminium hydroxide gel of Example 1 and, after the addition of 2.5 g glycerol, the mixture was heated with stirring to 80° C. 61.6 g magnesium hydroxide carbonate and 17.6 g magnesium oxide were added to the mixture as in Example 1. The further procedure was as described in Example 1. A powder-form spray-dried product having a specific BET surface of 96 m²/g was obtained and was redried for 2 hours at 200° C. in a drying cabinet.

As in Example 2, 19.4 g of this product were ground with 0.6 g copolymer 1, 0.6 g epoxidized soybean oil (SV 125; EO 5.8) and 80 g fully deionized water in a glass ball mill. The glass balls were then removed by sieving as in Example 2 and the solid was filtered and washed with fully deionized water. The hydrotalcite thus modified was then dried at 110° C. in a recirculating air drying cabinet, powdered and redried for 2 hours at 200° C. in a drying cabinet.

Comparison substances

C1

"Alcamizer ® 4" commercial PVC stabilizer of Kyowa Chemical Ind. based on hydrotalcite having a specific BET surface of 8 m²/g (see "Introduction of Alcamizer" Kyowa Chem Ind. Co. Ltd., pages 2-36, Isuriganecho, Higashi-Ku, Osaka).

C2

Spray-dried hydrotalcite prepared in accordance with Example 1 but with no addition of additives and with no redrying.

C3

Spray-dried hydrotalcite prepared in accordance with Example 1, but with no addition of additives. After spray-drying, this hydrotalcite was redried for 2 hours at 200° C. in a laboratory drying cabinet.

C4

19.4 g hydrotalcite of the C 300 type (Giulini Chemie GmbH), BET surface 115 m²/g, were stirred, but not ground, with 0.6 g copolymer 1 and 80 g fully deionized water for two hours at 80° C. The solid was filtered off and the undissolved particles of copolymer 1 were mechanically removed. The solid was then dried at 75° C. in a vacuum drying cabinet, powdered and redried for 2 hours at 200° C.

B) Application Examples

Sheeted-out compounds containing stabilizer mixtures of 0.5 part by weight zinc stearate, 0.5 part by weight calcium stearate, 0.2 part by weight stearoyl benzoyl methane (Rhodiastab ® 50)

1.0 part by weight of the substances of Examples 1, 2 and 3 according to the invention and comparison substances 1 to 4 based on 100 parts by weight suspension polyvinyl chloride having a K value of 65, were tested for "static stability".

To this end, polyvinyl chloride molding compounds containing stabilizer mixtures were processed to test strips on co-rotating laboratory mixing rolls measuring 450×220 mm (Berstorff) at a roll temperature of 170° C. and at a roll speed of 12.5 r.p.m. The approx. 0.5 mm thick strips were cut into square test specimens (edge length 10 mm) which were then exposed to a temperature of 180° C. in a drying cabinet having 6 rotating trays (Heraeus FT 420 R). Samples were taken at 15 minute intervals and examined for changes in color. Discoloration was evaluated on a scale of 1 (colorless) to 10 (black, stability failure).

The results are set out in Table 2.

TABLE 2

| | | Stability of the PVC molding compounds | | | | | | | |
|---|---|---|---|---|---|---|---|---|---|
| | Additive of | Color mark after minutes | | | | | | | |
| Example | Example | 0 | 15 | 30 | 45 | 60 | 75 | 90 | 105 | 120 |
| A | 1a | 1 | 1 | 2 | 3 | 4 | 7 | 10 | | |
| B | 1b | 1 | 1 | 2 | 3 | 4 | 7 | 9 | 10 | |
| C | 1c | 1 | 1 | 2 | 2 | 4 | 6 | 10 | | |
| D | 1d | 1 | 2 | 2 | 3 | 4 | 6 | 8 | 9 | 10 |
| E | 1e | 1 | 2 | 2 | 3 | 5 | 7 | 8 | 10 | |
| F | 2a | 1.5 | 2 | 3 | 5 | 8 | 10 | | | |
| G | 2b | 1 | 2 | 2 | 5 | 7 | 9 | 10 | | |
| H | 2c | 1 | 2 | 3 | 5 | 7 | 9 | 10 | | |
| I | 3 | 1.5 | 2 | 3 | 4 | 5 | 6 | 7 | 8 | 10 |
| J | C1 | 1 | 2 | 3 | 5 | 7 | 10 | | | |
| K | C2 | 1.5 | 2 | 4 | 8 | 10 | | | | |
| L | C3 | 1 | 2 | 4 | 8 | 10 | | | | |
| M | C4 | 2 | 3 | 4 | 7 | 10 | | | | |

We claim:

1. A process for the production of a composition of matter useful as a co-stabilizer for halogen-containing synthetic resins, said process comprising:

a) precipitating a cationic layer compound corresponding to general formula:

$$[M^{(II)}_x M^{(III)}(OH)_y](A^{n-})_z \cdot mH_2O \qquad (I)$$

in which $M^{(II)}$ represents at least one divalent metal ion, $M^{(III)}$ represents at least one trivalent metal ion, $A^{n-}$ represents an acid anion having a charge n with n=1, 2 or 3, with the proviso that $1<x<5$, $0\leq z<y$, $(y+nz)=2x+3$ and $0<m<10$, said cationic layer compound having a specific BET surface of at least 50 m²/g, from an aqueous solution or suspension containing the ions $M^{(II)}$, $M^{(III)}$ and $A^{n-}$ in the presence of one or more polymeric additives which are soluble in polar organic solvents and/or in water having pH values above 8 and which have a molecular weight of 500 to 50,000, and b) drying the compound so precipitated.

2. A process as claimed in claim 1 wherein said aqueous solution or suspension is further comprised of one or more additional additives selected from the following groups:

polyols containing 3 to 30 carbon atoms and at least two hydroxyl groups, esters of partly or completely epoxidized unsaturated carboxylic acids containing 6 to 22 carbon atoms, full or partial esters of polyols containing 3 to 30 carbon atoms and 2 to 12 hydroxyl groups with carboxylic acids containing 6 to 22 carbon atoms, and alkyl or aryl phosphites.

3. A process as claimed in claim 1 wherein, after said drying, the precipitated and dried product is ground in the presence of a solvent or water containing one or more additional additives selected from the following groups:
polyols containing 3 to 30 carbon atoms and at least two hydroxyl groups,
esters of partly or completely epoxidized unsaturated carboxylic acids containing 6 to 22 carbon atoms,
full or partial esters of polyols containing 3 to 30 carbon atoms and 2 to 12 hydroxyl groups with carboxylic acids containing 6 to 22 carbon atoms, and
alkyl or aryl phosphites.

4. A process as claimed in claim 1 wherein $M^{(II)}$ represents a divalent magnesium ion or $M^{(III)}$ represents a trivalent aluminum ion or $A^{n-}$ represents a carbonate ion.

5. A process as claimed in claim 1 wherein said layer compound corresponding to general formula 1 is a hydrotalcite.

6. A process as claimed in claim 1 wherein said polymeric additive is selected from the group consisting of acrylic acid or methacrylic acid homo- or copolymers, lignin sulfonates and trimer fatty acids.

7. A process as claimed in claim 1 wherein said polymeric additive is selected from the group consisting of polymers of acrylic or methacrylic acid and copolymers thereof with unsaturated monomers containing sulfonic acid groups, unsaturated monomers containing phosphonic acid groups, unsaturated aliphatic $C_{3-5}$ carboxylic acids, amides of unsaturated aliphatic $C_{3-5}$ carboxylic acids, aminofunctional unsaturated monomers and/or salts thereof, vinyl acetate, vinyl chloride, acrylonitrile, vinylidene chloride, 1,3-butadiene, styrene or alkyl styrenes containing 1 to 4 C atoms in the alkyl group.

8. A process as claimed in claim 1 wherein said polymeric additive is selected from the group consisting of polymers of acrylic acid or methacrylic acid and copolymers thereof with styrene, alkyl styrenes containing 1 to 4 C atoms in the alkyl group, styrene sulfonic acid, maleic acid and/or salts thereof or maleic anhydride.

9. A process as claimed in claim 1 wherein said polymeric additive has a molecular weight of 1,000 to 10,000.

10. A process as claimed in claim 1 wherein said aqueous solution or suspension is further comprised of one or more additives from the group consisting of $C_{3-30}$ polyols containing at least one hydroxyl group or an ether oxygen atom for every 3 C atoms.

11. A process as claimed in claim 10 wherein said polyols are selected from the group consisting of glycerol and/or technical oligoglycerol mixtures having average degrees of condensation of 2 to 10.

12. A process as claimed in claim 1 wherein said aqueous solution or suspension is further comprised of one or more additives from the group consisting of esters of trihydric alcohols and completely epoxidized unsaturated $C_{12-22}$ carboxylic acids.

13. A process as claimed in claim 12 wherein said esters are selected from the group of epoxidized soybean oil, epoxidized rapeseed oil and epoxidized sunflower oil.

14. A process as claimed in claim 1 wherein said aqueous solution or suspension is further comprised of one or more additives from the group consisting of partial esters of glycerol, technical oligoglycerol mixtures having average degrees of condensation of 2 to 10 and saturated and/or unsaturated aliphatic $C_{6-22}$ carboxylic acids.

15. A process of claim 1 wherein said polymeric additive comprises from 0.5% to 15% by weight of said cationic layer compound.

16. A process as claimed in claim 1 wherein said aqueous solution or suspension is further comprised of one or more additional additives selected from the following groups:
polyols containing 3 to 30 carbon atoms and at least two hydroxyl groups,
esters of partly or completely epoxidized unsaturated carboxylic acids containing 6 to 22 carbon atoms,
full or partial esters of polyols containing 3 to 30 carbon atoms and 2 to 12 hydroxyl groups with carboxylic acids containing 6 to 22 carbon atoms and
alkyl or aryl phosphites,
wherein the total quantity of said polymeric additive and said additional additive ranges from 0.5 to 15% by weight of said cationic layer compound, wherein said polymeric additive comprises 10 to 99% by weight, based on the total quantity of additives.

17. A process as claimed in claim 16 wherein said polymeric additive is 30 to 95% by weight of the total quantity of additives.

18. A composition of matter produced by the process of claim 1.

19. A composition of matter as claimed in claim 18 further comprising a calcium and/or zinc salt of a $C_{6-22}$ carboxylic acid.

20. A method of co-stabilizing a halogen-containing resin comprising mixing a halogen-containing resin with a composition as claimed in claim 18.

21. A resin composition comprising a halogen-containing synthetic resin and a composition of matter produced by the process of claim 1.

22. A resin composition as claimed in claim 21 further comprising a calcium and/or zinc salt of a $C_{6-22}$ carboxylic acid.

23. A process for the production of a composition of matter useful as a co-stabilizer for halogen-containing synthetic resins, said process comprising:
a) grinding a cationic layer compound corresponding to general formula:

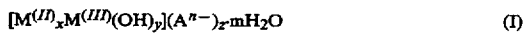

$$[M^{(II)}_x M^{(III)}(OH)_y](A^{n-})_z \cdot mH_2O \qquad (I)$$

in which
$M^{(II)}$ represents at least one divalent metal ion,
$M^{(III)}$ represents at least one trivalent metal ion,
$A^{n-}$ represents an acid anion having a charge n with $n=1, 2$ or $3$, with the proviso that $1<x<5$, $0\leq z<y$, $(y+nz)=2x+3$ and $0<m<10$, said cationic layer compound having a specific BET surface of at least 50 $m^2/g$, in the presence of solvents or water and in the presence of one or more polymeric additives which are soluble in polar organic solvents and/or in water having pH values above 8 and which have a molecular weight of 500 to 50,000, and
b) drying the compounds so ground.

24. A process as claimed in claim 23 wherein said cationic layer compound is, during said grinding, in the presence of one or more additional additives selected from the following groups:
polyols containing 3 to 30 carbon atoms and at least two hydroxyl groups,
esters of partly or completely epoxidized unsaturated carboxylic acids containing 6 to 22 carbon atoms, full or partial esters of polyols containing 3 to 30 carbon atoms and 2 to 12 hydroxyl groups with carboxylic acids containing 6 to 22 carbon atoms and alkyl or aryl phosphites.

25. A process as claimed in claim 23 wherein, prior to said grinding, said cationic layer compounds are precipitated in the presence of a solvent or water containing one or more additional additives selected from the following groups:

polyols containing 3 to 30 carbon atoms and at least two hydroxyl groups, esters of partly or completely epoxidized unsaturated carboxylic acids containing 6 to 22 carbon atoms, full or partial esters of polyols containing 3 to 30 carbon atoms and 2 to 12 hydroxyl groups with carboxylic acids containing 6 to 22 carbon atoms and alkyl or aryl phosphites.

26. A process as claimed in claim 23 wherein $M^{(II)}$ represents a divalent magnesium ion or $M^{(III)}$ represents a trivalent aluminum ion or $A^{n-}$ represents a carbonate ion.

27. A process as claimed in claim 23 wherein said layer compound corresponding to general formula 1 is a hydrotalcite.

28. A process as claimed in claim 23 wherein said polymeric additive is selected from the group consisting of acrylic acid or methacrylic acid homo- or copolymers, lignin sulfonates and trimer fatty acids.

29. A process as claimed in claim 23 wherein said polymeric additive is selected from the group consisting of polymers of acrylic or methacrylic acid and copolymers thereof with unsaturated monomers containing sulfonic acid groups, unsaturated monomers containing phosphonic acid groups, unsaturated aliphatic $C_{3-5}$ carboxylic acids, amides of unsaturated aliphatic $C_{3-5}$ carboxylic acids, aminofunctional unsaturated monomers and/or salts thereof, vinyl acetate, vinyl chloride, acrylonitrile, vinylidene chloride, 1,3-butadiene, styrene or alkyl styrenes containing 1 to 4 C atoms in the alkyl group.

30. A process as claimed in claim 23 wherein said polymeric additive is selected from the group consisting of polymers of acrylic acid or methacrylic acid and copolymers thereof with styrene, alkyl styrenes containing 1 to 4 C atoms in the alkyl group, styrene sulfonic acid, maleic acid and/or salts thereof or maleic anhydride.

31. A process as claimed in claim 23 wherein said polymeric additive has a molecular weight of 1,000 to 10,000.

32. A process as claimed in claim 23 wherein said aqueous solution or suspension is further comprised of one or more additives from the group consisting of $C_{3-30}$ polyols containing at least one hydroxyl group or an ether oxygen atom for every 3 C atoms.

33. A process as claimed in claim 32 wherein said polyols are selected from the group consisting of glycerol and/or technical oligoglycerol mixtures having average degrees of condensation of 2 to 10.

34. A process as claimed in claim 23 wherein said aqueous solution or suspension is further comprised of one or more additives from the group consisting of esters of trihydric alcohols and completely epoxidized unsaturated $C_{12-22}$ carboxylic acids.

35. A process as claimed in claim 34 wherein said esters are selected from the group consisting of epoxidized soybean oil, epoxidized rapeseed oil and epoxidized sunflower oil.

36. A process as claimed in claim 23 wherein said aqueous solution or suspension is further comprised of one or more additives from the group consisting of partial esters of glycerol, technical oligoglycerol mixtures having average degrees of condensation of 2 to 10 and saturated and/or unsaturated aliphatic $C_{6-22}$ carboxylic acids.

37. A process of claim 23 wherein said polymeric additive comprises from 0.5% to 15% by weight of said cationic layer compound.

38. A process as claimed in claim 23 wherein said aqueous solution or suspension is further comprised of the one or more additional additives selected from the following groups:

polyols containing 3 to 30 carbon atoms and at least two hydroxyl groups, esters of partly or completely epoxidized unsaturated carboxylic acids containing 6 to 22 carbon atoms, full or partial esters of polyols containing 3 to 30 carbon atoms and 2 to 12 hydroxyl groups with carboxylic acids containing 6 to 22 carbon atoms and alkyl or aryl phosphites, wherein the total quantity of said polymeric additive and said additional additive ranges from 0.5 to 15% by weight of said cationic layer compound, wherein said polymeric additive comprises 10 to 99% by weight, based on the total quantity of additives.

39. A process as claimed in claim 38 wherein said polymeric additive is 30 to 95% by weight of the total quantity of additives.

40. A composition of matter produced by the process of claim 23.

41. A composition of matter as claimed in claim 40 further comprising a calcium and/or zinc salt of a $C_{6-22}$ carboxylic acid.

42. A method of co-stabilizing a halogen-containing resin comprising mixing a halogen-containing resin with a composition as claimed in claim 40.

43. A resin composition comprising a halogen-containing synthetic resin and a composition produced by the process of claim 21.

44. A resin composition as claimed in claim 43 further comprising a calcium and/or zinc salt of a $C_{6-22}$ carboxylic acid.

45. A process as claimed in claim 1 wherein said BET surface area is from 70 to 180 m$^2$/g.

46. A composition as claimed in claim 18 wherein the BET surface area of the cationic layer compound in said composition is from 70 to 180 m$^2$/g.

47. A method as claimed in claim 20 wherein the BET surface area of the cationic layer compound in said composition is from 70 to 180 m$^2$/g.

48. A resin composition as claimed in claim 21 wherein the BET surface area of the cationic layer compound in said composition is from 70 to 180 m$^2$/g.

49. A process as claimed in claim 23 wherein said BET surface area is from 70 to 180 m$^2$/g.

50. A composition as claimed in claim 40 wherein the BET surface area of the cationic layer compound in said composition is from 70 to 180 m$^2$/g.

51. A method as claimed in claim 42 wherein the BET surface area of the cationic layer compound in said composition is from 70 to 180 m$^2$/g.

52. A resin composition as claimed in claim 43 wherein the BET surface area of the cationic layer compound in said composition is from 70 to 180 m$^2$/g.

* * * * *